United States Patent
Himstedt et al.

(10) Patent No.: US 12,074,329 B2
(45) Date of Patent: Aug. 27, 2024

(54) ACID BATTERY PASTING CARRIER

(71) Applicant: JOHNS MANVILLE, Denver, CO (US)

(72) Inventors: Heath H Himstedt, Littleton, CO (US); Souvik Nandi, Highlands Ranch, CO (US); John Scherlein, Fairport, NY (US)

(73) Assignee: Johns Manville, Denver, CO (US)

( * ) Notice: Subject to any disclaimer, the term of this patent is extended or adjusted under 35 U.S.C. 154(b) by 103 days.

(21) Appl. No.: 17/831,215

(22) Filed: Jun. 2, 2022

(65) Prior Publication Data
US 2022/0293959 A1 Sep. 15, 2022

Related U.S. Application Data

(62) Division of application No. 16/803,493, filed on Feb. 27, 2020, now Pat. No. 11,417,889, which is a division of application No. 15/439,687, filed on Feb. 22, 2017, now Pat. No. 10,622,639.

(51) Int. Cl.
| | |
|---|---|
| H01M 4/66 | (2006.01) |
| H01M 4/82 | (2006.01) |
| H01M 10/06 | (2006.01) |
| H01M 50/417 | (2021.01) |
| H01M 50/437 | (2021.01) |
| H01M 50/44 | (2021.01) |
| H01M 50/446 | (2021.01) |
| H01M 50/46 | (2021.01) |

(52) U.S. Cl.
CPC .............. *H01M 4/664* (2013.01); *H01M 4/82* (2013.01); *H01M 10/06* (2013.01); *H01M 50/417* (2021.01); *H01M 50/437* (2021.01); *H01M 50/44* (2021.01); *H01M 50/446* (2021.01); *H01M 50/46* (2021.01); *H01M 2220/20* (2013.01)

(58) Field of Classification Search
CPC ........ H01M 4/664; H01M 4/82; H01M 10/06; H01M 50/417; H01M 50/437; H01M 50/44; H01M 50/446; H01M 50/46; H01M 2220/20
See application file for complete search history.

(56) References Cited

U.S. PATENT DOCUMENTS

| | | |
|---|---|---|
| 3,085,126 A | 4/1963 | Labino |
| 4,336,314 A | 6/1982 | Yonezu et al. |
| 5,281,498 A * | 1/1994 | Muto .................. H01M 50/494 429/247 |
| 6,306,539 B1 | 10/2001 | Zguris |
| 6,509,118 B1 | 1/2003 | Pavlov et al. |
| 6,821,672 B2 | 11/2004 | Zguris |
| 11,417,889 B2 | 8/2022 | Himstedt et al. |

(Continued)

FOREIGN PATENT DOCUMENTS

| | | |
|---|---|---|
| EP | 0 515 105 A2 | 11/1992 |
| EP | 0 692 830 A1 | 1/1996 |

(Continued)

*Primary Examiner* — Daniel S Gatewood
(74) *Attorney, Agent, or Firm* — Robert D. Touslee

(57) ABSTRACT

A pasting carrier for a lead-acid battery. The pasting carrier includes a nonwoven fiber mat having a thickness between 5 and 50 mils, the nonwoven fiber mat being composed of a plurality of entangled glass microfibers.

15 Claims, 3 Drawing Sheets

(56) References Cited

U.S. PATENT DOCUMENTS

| | | |
|---|---|---|
| 2011/0318643 A1 | 12/2011 | Clement et al. |
| 2013/0101887 A1 | 4/2013 | Sugiyama et al. |
| 2015/0099157 A1 | 4/2015 | Ketzer et al. |
| 2015/0099168 A1 | 4/2015 | Guo et al. |
| 2015/0099189 A1* | 4/2015 | Ketzer .................... H01M 4/14 |
| | | 429/246 |
| 2016/0268567 A1* | 9/2016 | Guo .................... H01M 50/437 |

FOREIGN PATENT DOCUMENTS

| | | |
|---|---|---|
| EP | 2 858 142 A1 | 4/2015 |
| EP | 3 067 963 A1 | 9/2016 |
| RU | 2 249 884 C2 | 3/2002 |
| WO | 2010098796 A1 | 9/2010 |

\* cited by examiner

ACID BATTERY PASTING CARRIER

CROSS-REFERENCE TO RELATED APPLICATIONS

This application is a division of pending U.S. application Ser. No. 16/803,493 filed Feb. 27, 2020, which application is a division of U.S. application Ser. No. 15/439,687 filed Feb. 22, 2017, now U.S. Pat. No. 10,622,639 issued Apr. 14, 2020. The entire contents of the above-identified applications are herein incorporated by reference for all purposes.

FIELD OF THE INVENTION

The disclosure generally relates to acid batteries.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Lead-acid batteries are widely used because of their reliability and relatively low cost. For example, most automobiles include a lead-acid battery to start the engine and power various onboard systems. Although there are many types of lead-acid batteries, their general construction includes positive and negative electrodes in contact with an acid electrolyte, typically dilute sulfuric acid. During discharge, the lead-acid battery produces electricity as the sulfuric acid reacts with the electrodes. More specifically, the acid electrolyte combines with the negative and positive electrodes to form lead sulfate. As lead sulfate forms, the negative electrode releases electrons and the positive plate loses electrons. The net positive charge on the positive electrode attracts the excess negative electrons from the negative electrode enabling the battery to power a load. To recharge the acid-battery, the chemical process is reversed.

As the lead-acid battery discharges, the positive and negative electrodes expand as lead sulfate forms on and in within the electrodes. Likewise as the lead-acid battery charges, the electrodes contract as the lead sulfate dissolves. Over time, the expansion and contraction of the electrodes may cause pieces of the electrodes to break off. In addition to breaking down in an acid environment, the lead in the electrodes increases the overall weight of the lead-acid battery.

BRIEF SUMMARY

The present disclosure is directed to various embodiments of a pasting carrier for a lead-acid battery. The pasting carrier includes a nonwoven fiber mat having a thickness between 5 and 50 mils, the nonwoven fiber mat being composed of a plurality of entangled glass microfibers. The nonwoven mat includes between 30 and 60 weight percentage of smaller sized glass microfibers having an average fiber diameter between 150 and 550 nanometers, between 0 and 40 weight percentage of larger sized glass microfibers having an average fiber diameter between 0.6 and 6 microns, and between 15 and 60 weight percentage of a binder that binds the smaller sized glass microfibers and the larger sized glass microfibers together. The smaller sized glass microfibers and the larger sized glass microfibers are substantially homogenously or uniformly distributed and blended throughout the nonwoven fiber mat.

In another embodiment, a battery including a first electrode. The first electrode has a first highly conductive grid and a first pasting carrier. The first pasting carrier includes a nonwoven fiber mat having a thickness between 5 and 50 mils. The nonwoven fiber mat includes a plurality of entangled glass microfibers. A first conductive material couples to the first pasting carrier and to the first highly conductive grid. The wettability of the first pasting carrier enables the first pasting carrier to support the first conductive material by absorbing a portion of the first conductive material while preventing the first conductive material from passing through the first pasting carrier.

In another embodiment, a method of manufacturing a lead-acid pasting carrier. The method includes dispersing glass microfibers in an aqueous solution to form an aqueous slurry with the glass microfibers. The aqueous slurry is then distributed onto a screen to remove a liquid from the aqueous slurry to form a nonwoven fiber mat with entangled glass microfibers. A binder is then applied to the entangled glass microfibers to bond the glass microfibers together. The binder may be applied to the glass microfibers by mixing in the aqueous slurry or applied to the glass microfibers after removing the liquid from the aqueous slurry. The entangled glass microfibers are then dried to form the nonwoven fiber mat having a thickness between 5 and 50 mils. The wettability of the lead acid pasting carrier enables the pasting carrier to support a conductive material by absorbing a portion of the conductive material while preventing the conductive material from passing through the lead-acid pasting carrier.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION

Figure 1:
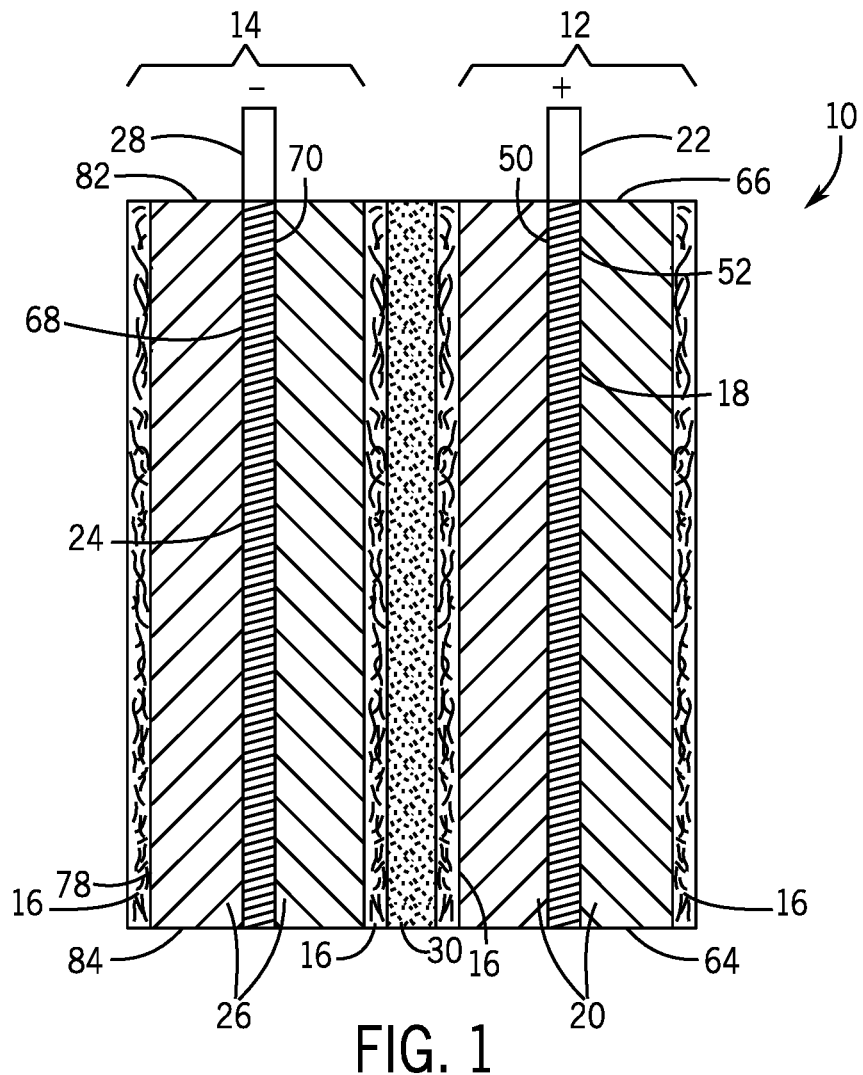
FIG. 1 is a cross-sectional view of an embodiment of a lead-acid battery cell.

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The terms acid resistant glass fibers and acid resistant binder are used in this description. Glass fibers can be acid resistant depending on their glass chemistry. According to DIN 12116 acid resistance/acid durability is classified into four classes depending on the amount of weight loss in an acid solution. In this description, glass fibers are considered acid resistant if they fall into categories S1-S3.

S1=acid proof 0.0-0.7 mg/dm$^2$ (weight loss)
S2=weakly acid soluble 0.7-1.5 mg/dm$^2$ (weight loss)
S3=moderately acid soluble 1.5-15.0 mg/dm$^2$ (weight loss)
S4=strongly acid soluble more than 15.0 mg/dm$^2$ (weight loss)

While the term acid resistant binder is widely used in the battery industry to mean a binder capable of withstanding a corrosive battery environment for the life of the battery, it still lacks a technical definition. In this description, acid resistant binder is defined using the test found in BCI Battery Technical Manual (BCIS-03B, Revised March-2010, "23. CHEMICAL/OXIDATION RESISTANCE BY HOT SULFURIC ACID"). The test uses acid resistant glass fibers (as defined above) that are formed into a nonwoven mat to achieve 20% binder LOI (loss on ignition) +/−3%. The nonwoven mat is then placed in boiling sulfuric acid (e.g., sulfuric acid that has a specific gravity of 1.280 at 25° C.) for approximately 3 hours and if the weight loss is less than 10 wt. % of the original mat weight, the binder is considered acid resistant.

The embodiments discussed below include a lead-acid battery cell with a highly conductive grid made out of a material other than a lead/lead alloy. As will be explained in detail below, the grid collects charge created by the electro-chemical reaction and channels the charge to a terminal to drive a load (e.g., radio, lights, etc.). By using a highly conductive grid, the lead-acid battery is able to more efficiently channel charge.

And by more efficiently channeling charge, the battery may maintain the same or substantially the same amount of electrical output with a smaller and/or a slower chemical reaction. The highly conductive grid may also be significantly lighter and thinner than typical lead grids, which reduces the overall size and weight of the battery.

However, the highly conductive grid may not be porous, and may therefore be unable to couple to and support the positive and negative plate pasting material. Furthermore, the exterior surface of the highly conductive grid may be slick, smooth, etc. and thus unable to couple and/or support the positive or negative plate pasting material. In other words, without some kind of support the positive or negative plate pasting material may not adhere to the grid (e.g., slide off during manufacture). The embodiments below disclose a pasting carrier capable of coupling to and supporting the positive and negative plate pasting material enabling electrical contact between the grid and the pasting material. In some embodiments, the pasting carrier may also have a reduced porosity that slows the electro-chemical reaction by reducing ionic transport between the positive and negative electrodes enabling the battery to take advantage of the highly conductive grid (e.g., use less lead in the reaction, extend battery life, increase time of discharge, etc.).

As will be explained below, the pasting carrier has sufficient structural strength to support and is sufficiently wettable to absorb a portion of the positive or negative plate pasting material while blocking the positive or negative material from passing through the pasting carrier. Once the positive or negative plate pasting material dries on the pasting carrier, the pasting carrier retains and supports the material during operation of the battery.

FIG. 1 is a cross-sectional view of an embodiment of a lead-acid battery cell 10. Each cell 10 provides an electromotive force (i.e., volts) that may be used for powering a load (e.g., car, lights, radio, etc.). Lead-acid batteries may include multiple cells 10 in series or parallel to increase either the voltage or current flow. The cell 10 includes a positive electrode 12 and a negative electrode 14 and pasting carriers 16 that support positive and negative plate pasting material 20, 26. The positive electrode 12 includes a grid 18 made out of a highly conductive material. The term highly conductive material refers to materials excluding lead/lead alloys that have a conductivity greater than 6×10$^6$ Siemens per meter at 20 degrees Celsius. For example, the highly conductive material may be silicon based (e.g., silicon containing conductive impurities), which not only has a high conductivity but is capable of resisting corrosion in a lead-acid battery environment (e.g., sulfuric acid corrosion). Other highly conductive materials may include graphene, zinc, aluminum, copper, or other materials. Because the grid 18 is made from a highly conductive material, the grid 18 is thinner, lighter, and more efficient than a typical lead grid.

The increased efficiency of the grid 18 may enable each cell 10 to use less positive and negative plate pasting material 20, 26 to perform the electro-chemical reaction, further reducing the weight of the cell 10. A battery containing the highly conductive grids 18 may therefore increase the charge density (i.e., capacity) of a battery without increasing its size, while simultaneously decreasing the weight of the battery, and increasing the life of the battery (i.e., the grid resists corrosion as the battery charges and discharges).

As explained above, the grid 18 may not be porous and may also have a slick exterior surface that is unable to couple to and/or support the positive and negative plate pasting material 20, 26. For this reason, the cell 10 includes the pasting carriers 16 that are capable of coupling to and supporting the positive plate pasting material 20 enabling electrical contact between the grid 18 and the pasting material 20. The positive plate pasting material 20 may include active positive material (e.g., lead dioxide), and other components and additives (e.g., like silica, calcium sulfate, etc.). In some embodiments, the grid 18 may have a positive terminal (e.g., current conductor) 22 to facilitate electrical connection to the negative electrode 14.

The pasting carriers 16 may also have a porosity that supports and couples to the positive plate pasting material 20 while still blocking the positive plate pasting material 20 from passing through the pasting carrier 16. The porosity of the pasting carrier 16 may be determined by measuring a volume of air that passes through the pasting carrier 16 over a specific period of time. For example, the air permeability of the pasting carrier 16 may correspond to a time between 2 and 50 seconds for 100 cubic centimeters of air to pass through the pasting carrier 16 at a pressure of roughly 12 millibar.

The negative electrode 14 may likewise include a grid 24 made out of a highly conductive material (e.g., silicon based material) that does not include lead/lead alloy and that has a conductivity greater than 6×10$^6$ Siemens per meter at 20 degrees Celsius. The grid 24 is similarly unable to couple and support a negative plate pasting material 26. Accordingly, the cell 10 includes pasting carriers 16 capable of coupling to and supporting the negative plate pasting material 26 enabling electrical contact between the grid 18 and the pasting material 26. The negative plate pasting material 26 may include active negative material (e.g., lead) and other components and additives (e.g., lignosulfonate, barium sulfate, and carbon material). The grid 24 may also include a negative terminal (e.g., current conductor) 28 to facilitate electrical connection to the positive electrode 12.

The electro-chemical reaction occurs when the positive and negative electrodes 12, 14 are immersed or are in contact with an electrolyte (e.g., 30-40% by weight sulfuric acid aqueous solution). In the chemical reaction, the negative electrode 14 releases electrons and the positive electrode 12 loses electrons as lead sulfate forms. The net positive charge on the positive plate attracts the excess negative electrons from the negative plate producing electricity. To block electricity from flowing directly between the positive and negative electrodes 12, 14 (i.e., short-circuiting), the cell 10 includes a battery separator 30. As illustrated, the battery separator 30 is positioned between the positive and negative electrodes 12, 14 to prevent electrical conduction, while still enabling ionic transport. During discharge, the positive ions flow from the anode (i.e., negative electrode 14) through the separator 30 to the cathode (i.e., positive electrode 12). Similarly, as the battery charges the positive ions flow from the cathode (i.e., negative electrode 14) through the separator 30 to the anode (i.e., positive electrode 12).

In some embodiments, the positive electrode 12 includes positive plate pasting material 20 on opposing sides 50 and 52 of the grid 18 that are supported by respective pasting carriers 16. By including positive plate pasting material 20 on sides 50 and 52, the positive electrode 12 is able to form part of two neighboring cells 10.

The negative electrode 14 may also include negative plate pasting material 26 on opposing sides 68, 70 of the grid 24 supported by respective pasting carriers 16. By including negative plate pasting material 26 on both sides 68 and 70, the negative electrode 14 is able to form part of two cells 10.

Figure 2:
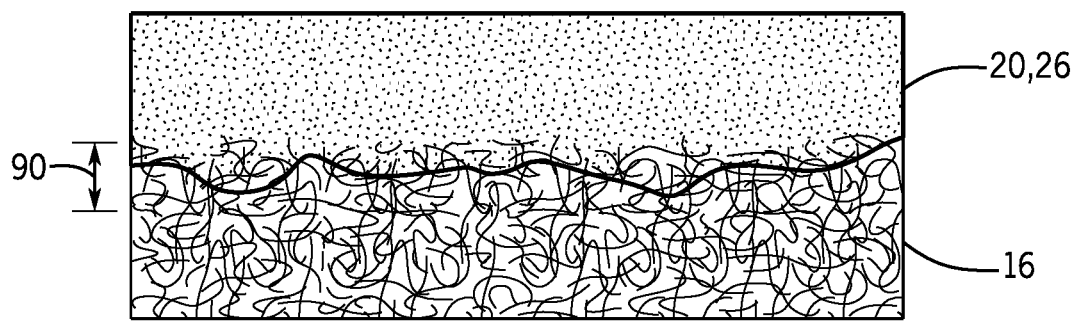
FIG. 2 is a cross-sectional view of an embodiment of a pasting carrier.
Figure 3:
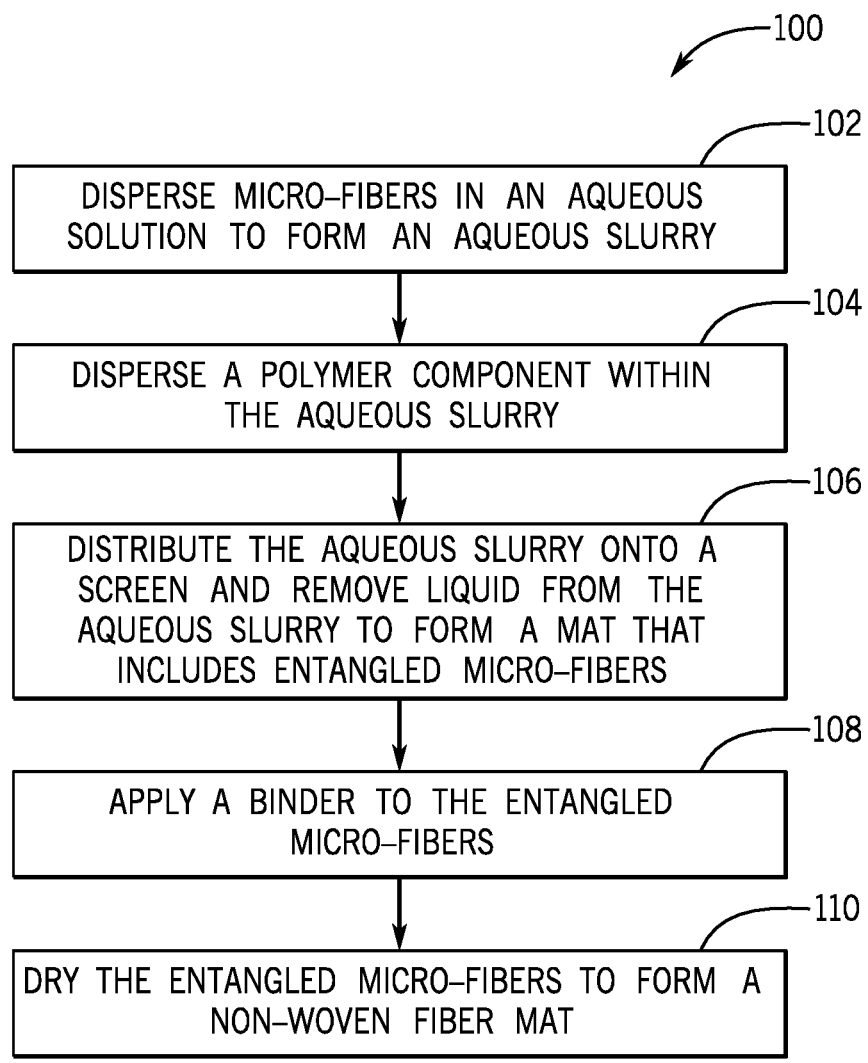
FIG. 3 is an embodiment of a method for manufacturing a pasting carrier.

FIG. 2 is a cross-sectional view of an embodiment of a pasting carrier 16. As illustrated, the pasting carrier 16 couples to and supports the positive or negative plate pasting material 20, 26. The pasting carrier 16 is a single layer nonwoven fiber mat of acid resistant glass fibers (e.g., C glass, T glass). In some embodiments, the nonwoven fiber mat is composed substantially or entirely of glass microfibers. In other words, the nonwoven fiber mat may not include, or may otherwise be free of, coarse fibers or larger diameter fibers in excess of 20 μm in diameter. As used herein, the term microfiber means fibers that have an average fiber diameter of 6 μm or less. It should be understood that normal deviations from the average fiber diameter are included within the term and that such deviations are envisioned in the embodiments described herein. For example, the reference to microfibers having an average fiber diameter of 6 μm implies that some of the fibers may have a diameter greater than 6 μm and that some of the fibers may have a diameter smaller than 6 μm, but that on average, the fiber diameters collectively average 6 μm. This applies to any of the claimed or described numerical values or ranges, such as other claimed or described fiber diameters or fiber diameter ranges. In some embodiments, the pasting carrier 16 may include chopped glass to increase the structural strength of the pasting carrier 16. The term chopped glass is understood to have fiber diameters that are between 7 and 17 microns. In some embodiments, the pasting carrier 16 may include between 0.5 and 5 percent of chopped glass.

In some embodiments, the nonwoven fiber mat includes a combination of different sized microfibers. The different sized microfibers will be described herein as "fine or smaller sized microfibers" and "coarse or larger sized microfibers." In some embodiments, all or substantially all of the fine and coarse sized microfibers are glass fibers. The term fine or smaller sized microfibers refers to fibers having an average fiber diameter of between 150 and 550 nanometers, and more commonly between 250 and 450 nanometers.

The term coarse or larger sized microfibers refers to fibers having an average fiber diameter of between 0.6 and 6 microns, and more commonly between 650 and 1,000 nanometers. In a specific embodiment, the nonwoven fiber mat does not include fibers having an average diameter smaller than 200 nm. In some embodiments, the length of the coarse microfibers may contribute to the strength of the pasting carrier 16 by physically entangling with and/or creating additional contact points for adjacent coarse and/or fine microfibers. The average lengths of the coarse microfibers are much greater than the diameters such that the aspect ratio is at least 1,000 and more commonly greater than 10,000.

The blend of coarse microfibers to fine microfibers may vary in percentage to achieve the desired characteristics/properties of the pasting carrier 16. These properties include porosity, thickness, and strength. For example, an increase in the number of fine sized microfibers may be used to reduce the thickness of the mat and to "close off" or reduce the porosity of the mat. Indeed the use of microfibers decreases the air permeability in comparison with conventional pasting carrier. However, the pasting carrier 16 is sufficiently wettable in order to retain and support the positive or negative plate pasting material 20, 26. As illustrated in FIG. 2, the pasting carrier 16 absorbs a portion of the positive or negative plate pasting material 20, 26 while blocking complete penetration of the positive or negative plate pasting material 20, 26 through the pasting carrier 16. For example, the positive or negative plate pasting material 20, 26 may penetrate a percentage of the pasting carrier width 90 between 5% and 50%. Once the positive or negative material 20, 26 hardens/dries on the pasting carrier 16, the pasting carrier 16 retains and supports the positive or negative material 20, 26.

In should be noted that the inclusion of too many fine sized microfibers may compromise the integrity of the nonwoven fiber mat and may cause the pasting carrier 16 to rip or tear in response to tension exerted during manufacturing or assembly of the cell 10. To balance these competing properties the percentage of fine microfibers may vary between 30% and 60% by weight.

The pasting carrier 16 also includes an acid resistant binder that binds the microfibers together. In some embodiments, the pasting carrier 16 includes between 15% and 60% weight percentage of a binder to bind the microfibers together (e.g., the smaller sized glass microfibers and the larger sized glass microfibers together. Most commonly, the binder weight percentage is between 25% and 45%. Acid resistant binders may be based on numerous chemistries which do not breakdown in acidic or alkaline environments. One example is the acrylic binder Dow Rhoplex HA-16.

In some embodiments, the acid resistant glass fibers may include a conductive outer coating that facilitates electron flow and the electro-chemical reactions within the cell 10. The conductive material may be sprayed, vapor deposited, or otherwise coated onto the acid resistant glass fibers. Because lead-acid batteries contain aggressive electro-chemical reactions, the conductive material may be made out of non-reactive material. For example, the conductive material may include a non-reactive metal, a nanocarbon, graphene, graphite, a conductive polymer (e.g., polyanilines), nanocarbons or carbon nanotubes, titanium oxides, vanadium oxides, tin oxides, and the like. In a specific embodiment, the conductive material may include carbon nano-platelets, such as graphene.

A polymer component may also be integrated or incorporated within the fiber matrix. For example, the glass microfibers may be combined with polymer fibers and/or a polymer. The use of the polymer fibers within the nonwoven fiber mat may increase the strength and/or flexibility of the nonwoven fiber mat. Since the polymer component is included within the fiber matrix, the nonwoven fiber mat is relatively thin and strong. For example, the nonwoven fiber mat typically has a thickness of between 5 and 50 mils, and more commonly between 15 and 30 mils. The nonwoven fiber mat also exhibits a strength of 0.8 to 20.0 pounds per inch and typically between 2.8 and 8.0 pounds per inch when measured on an Instron mechanical testing apparatus with a 100 pound load cell and a pull rate of one inch per minute tested according to ASTM D828 and a puncture resistance of at least 2 pounds per square inch as measured on a Mullen burst apparatus tested according to ASTM D774. The nonwoven also exhibits an air permeability between 0.31 and 7.5 centimeters per second. The use of microfibers greatly decreases the air permeability in comparison with conventional pasting carriers. The added polymer component (e.g., polypropylene emulsion) may further reduce the porosity to within the described range. In embodiments containing the polymer component, the polymer component is dispersed homogeneously throughout the entangled microfibers and is not concentrated in any area or adjacent one or more layers within the nonwoven fiber mat.

A single layer construction also enables the nonwoven fiber mat to achieve the described thinness. It may be more difficult to achieve the described thinness if a bi-layer or multilayer arrangement is used, such as when the polymer component is coated on one or more sides of the microfiber nonwoven fiber mat or when a polymer film is positioned on one side of the mat.

As described briefly above, the single layer pasting carrier described herein is a wet-laid mat comprised of glass microfibers and in some embodiments a polymeric component, which typically includes or consist of polypropylene or polyethylene chains.

The polymer chains may be introduced as polymer fibers or via another route, for example as an emulsion. The glass microfibers, polymer chains, binder, and other additives, such as additives that aid in processing (e.g., dispersing agents, surfactants, etc.), are mixed into a slurry. The final mat is produced by collecting the fibers onto a collection belt and then drying the collected fibers. The final product is a single layer nonwoven fiber mat in which all the components (i.e., the fibers, polymeric component, binder, etc.) are homogenously or uniformly dispersed or distributed throughout the mat.

In some instances, homogenous dispersion is achieved by removing fluid at an appropriate rate, which is typically a high vacuum rate. The components are mixed in the slurry so that they are homogenously or uniformly dispersed. If sufficient vacuum force is applied, the excess liquid is removed at a rate that results in the components remaining homogenously or uniformly dispersed. If the suction is inadequate then a poor dispersion of the components may result, and the polymeric component and/or microfibers may conglomerate or clump together.

In an exemplary embodiment, the pasting carrier 16 included approximately 40% by weight of an acid-resistant binder, for example Dow Rhoplex HA-16, and 60% by weight glass fibers, of which the larger glass microfibers (0.6 to 6 micron diameter) were roughly 30% by weight and the smaller glass microfibers (150 to 500 nanometers) were 30%. This pasting carrier 16 had a strength of roughly 1 pound per inch and a thickness of roughly 25 mils.

In another exemplary embodiment, the pasting carrier included approximately 40% by weight binder and 60% by weight glass fibers, of which the large glass microfibers (0.6 to 6 micron diameter) were roughly 3% by weight and the smaller glass microfibers (150 to 500 nanometers) were 57%. This pasting carrier 16 had a strength of roughly 2.8 pounds per inch and a thickness of roughly 12 mils. This result was unexpected in that small amounts of larger microfibers significantly increased the strength of the pasting carrier, while significant amounts of large microfibers did not lead to a significantly stronger pasting carrier.

In another exemplary embodiment, the air permeability was reduced while still maintaining a lofty mat—that is, a thicker more openly porous—with the intent to maximize performance by facilitating the majority of the pasting material remaining on the surface of the pasting carrier but with sufficient porosity to allow some absorption of pasting material to "anchor" the pasting material to the mat. The pasting carrier included approximately 42% by weight binder, 33% by weight glass fibers, and 25% by weight polymer, of which the larger glass microfibers (0.6 to 6 micron diameters) were roughly 1% by weight and the smaller glass microfibers (150 to 500 nanometers) were 32%. It had a strength of roughly 2 pounds per inch, a thickness of roughly 20 mils, and an air permeability of approximately 5 centimeters per second.

FIG. 4 is an embodiment of a method 100 manufacturing a pasting carrier 16. At block 102, microfibers (e.g., glass microfibers) are dispersed in an aqueous solution to form an aqueous slurry of homogeneously or uniformly dispersed microfibers. At block 104, a polymer component may be dispersed in the aqueous slurry of the microfibers so that the polymer component is homogenously or uniformly dispersed throughout the aqueous slurry. At block 106, the aqueous slurry is distributed onto a screen and a liquid is removed from the aqueous slurry to form a wet-laid nonwoven fiber mat atop the screen. The wet-laid nonwoven fiber mat is composed of microfibers and in some embodiments a polymer component and/or chopped glass.

At 108, a binder is applied to the entangled microfibers to bond the microfibers together with the polymer component homogenously distributed throughout the microfibers. At block 110, the wet-laid nonwoven fiber mat (i.e., the entangled microfibers) is dried to form a nonwoven fiber mat having a typical thickness of between 15 and 30 mils. In embodiments containing the polymer component, the polymer component may reduce the porosity and increase the strength and flexibility of the pasting carrier 16. In some embodiments, the binder is applied to the fibers by mixing the binder in the aqueous slurry, which then binds to the fibers after removal of the liquid from the slurry.

In an exemplary embodiment, the liquid is removed at a rate that blocks and/or limits aggregation of the components. In some embodiments, dispersing the microfibers in an aqueous solution includes dispersing between 30% and 60% weight percentage of smaller sized microfibers in the aqueous solution and/or 0% to 40% weight percentage of larger sized microfibers within the aqueous solution. The smaller sized microfibers may have an average fiber diameter of between 150 and 550 nanometers and the larger sized microfibers may have an average fiber diameter of between 0.6 and 6 microns. The smaller sized microfibers and the larger sized microfibers are homogenously or uniformly distributed within the aqueous slurry.

Dispersing the polymer component within the aqueous slurry of the microfibers may include dispersing 0% to 30% weight percentage of the polymer component within the aqueous slurry. Dispersing the polymer component within the aqueous slurry of the microfibers may also include dispersing polymer fibers and/or a polymer emulsion within the aqueous slurry.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of manufacturing a lead-acid pasting carrier, the method comprising:
    dispersing glass microfibers in an aqueous solution to form an aqueous slurry with the glass microfibers;
    dispersing a polymer component within the aqueous slurry of the glass microfibers so that the polymer component is homogenously or uniformly distributed throughout the aqueous slurry;
    distributing the aqueous slurry onto a screen and removing a liquid from the aqueous slurry to form a nonwoven fiber mat comprising entangled glass microfibers;
    applying a binder to the entangled glass microfibers to bond the glass microfibers together, wherein the binder may be applied to the glass microfibers by mixing in the aqueous slurry or applied to the glass microfibers after removing the liquid from the aqueous slurry; and
    drying the entangled glass microfibers to form the nonwoven fiber mat having a thickness between 5 and 50 mils;
    wherein a wettability of the lead acid pasting carrier enables the pasting carrier to support a conductive material by absorbing a portion of the conductive material while preventing the conductive material from passing through the lead-acid pasting carrier.

2. The method of claim 1, wherein the polymer component is a non-fibrous polymer component.

3. The method of claim 2, wherein the non-fibrous polymer component is homogenously dispersed across a thickness of the nonwoven fiber mat.

4. The method of claim 1, wherein the liquid is removed at a sufficient rate in order to ensure uniform or homogenous dispersion of the glass microfiber and polymer components.

5. The method of claim 1, wherein dispersing the glass microfibers in the aqueous solution comprises dispersing between 30 and 60 weight percentage of smaller sized glass microfibers in the aqueous solution, the smaller sized glass microfibers having an average fiber diameter between 250 and 450 nanometers.

6. The method of claim 1, wherein dispersing the glass microfibers in the aqueous solution further comprises dispersing between 0 and 40 weight percentage of larger sized glass microfibers within the aqueous solution, the larger sized glass microfibers having an average fiber diameter between 0.65 and 1 microns, the smaller sized glass microfibers and the larger sized glass microfibers being homogenously or uniformly distributed within the aqueous slurry.

7. The method of claim 1, further comprising applying the lead-acid pasting carrier to an electrode comprising a conductive grid and a conductive material.

8. A method of manufacturing a lead-acid pasting carrier, the method comprising:
    dispersing glass microfibers in an aqueous solution to form an aqueous slurry with the glass microfibers;
    dispersing a polymer component within the aqueous slurry so that the polymer component is homogenously or uniformly distributed throughout the aqueous slurry;
    distributing the aqueous slurry onto a screen and removing a liquid from the aqueous slurry to form a nonwoven fiber mat comprising entangled glass microfibers;
    applying a binder to the entangled glass microfibers to bond the glass microfibers together, wherein the binder may be applied to the glass microfibers by mixing in the aqueous slurry or applied to the glass microfibers after removing the liquid from the aqueous slurry; and drying the entangled glass microfibers to form the nonwoven fiber mat;

wherein a wettability of the lead acid pasting carrier enables the pasting carrier to support a conductive material by absorbing a portion of the conductive material while preventing the conductive material from passing through the lead-acid pasting carrier.

9. The method of claim 8, wherein the non-fibrous polymer component is homogenously dispersed across a thickness of the nonwoven fiber mat.

10. The method of claim 8, wherein the non-fibrous polymer component comprises polypropylene.

11. The method of claim 8, wherein dispersing the glass microfibers in the aqueous solution comprises dispersing between 30 and 60 weight percentage of smaller sized glass microfibers in the aqueous solution, the smaller sized glass microfibers having an average fiber diameter between 250 and 450 nanometers.

12. The method of claim 8, wherein dispersing the glass microfibers in the aqueous solution further comprises dispersing between 0 and 40 weight percentage of larger sized glass microfibers within the aqueous solution, the larger sized glass microfibers having an average fiber diameter between 0.65 and 1 microns, the smaller sized glass microfibers and the larger sized glass microfibers being homogenously or uniformly distributed within the aqueous slurry.

13. The method of claim 8, wherein applying the binder comprises applying between 25 and 45 weight percentage of the binder.

14. The method of claim 8, further comprising applying the lead-acid pasting carrier to an electrode comprising a conductive grid and a conductive material.

15. A method of manufacturing a lead-acid battery, the method comprising:

providing a first electrode comprising:
a highly conductive grid; and
a conductive material; and applying the pasting carrier of claim 8 to the first electrode.

* * * * *